United States Patent [19]

Ott

[11] 4,371,178
[45] Feb. 1, 1983

[54] SEALING ARRANGEMENT, PARTICULARLY FOR SEALING VALVE PISTON RELATIVE TO VALVE HOUSING

[75] Inventor: Helmut Ott, Stuttgart, Fed. Rep. of Germany

[73] Assignee: Herion-Werke KG, Fellbach, Fed. Rep. of Germany

[21] Appl. No.: 226,898

[22] Filed: Jan. 21, 1981

[30] Foreign Application Priority Data

Jan. 25, 1980 [DE] Fed. Rep. of Germany ....... 3002715

[51] Int. Cl.³ .......................... F16K 3/24; F16J 15/56
[52] U.S. Cl. .................................... 277/154; 277/155; 277/193; 277/199; 251/361; 251/363
[58] Field of Search ........................ 277/192, 193–199, 277/148, 155; 251/361, 363

[56] References Cited

U.S. PATENT DOCUMENTS 1,451,814  4/1923  Cullinan ........................... 277/199 X
2,628,139  2/1953  Gilliland ........................... 277/194 X
3,291,495  12/1966  Liebig ................................. 277/152
3,709,507  1/1973  Underwood ....................... 277/194 X
4,099,798  7/1978  Steinmetz ..................... 277/207 A X

FOREIGN PATENT DOCUMENTS 2027334  12/1970  Fed. Rep. of Germany ...... 277/193
851572  10/1960  United Kingdom ................ 220/378

Primary Examiner—Robert S. Ward, Jr.
Attorney, Agent, or Firm—Michael J. Striker

[57] ABSTRACT

A sealing arrangement, particularly for sealing a valve piston relative to a valve housing, has a plurality of sealing rings arranged to be located between a valve piston and a valve housing, and axially spaced from each other, and a plurality of supporting rings located axially adjacent to each other and arranged to support and hold the sealing rings, wherein the supporting rings are connected with the sealing rings in interengaging manner so as to form together with the latter an integral unit which can be mounted and dismounted as a whole.

18 Claims, 14 Drawing Figures

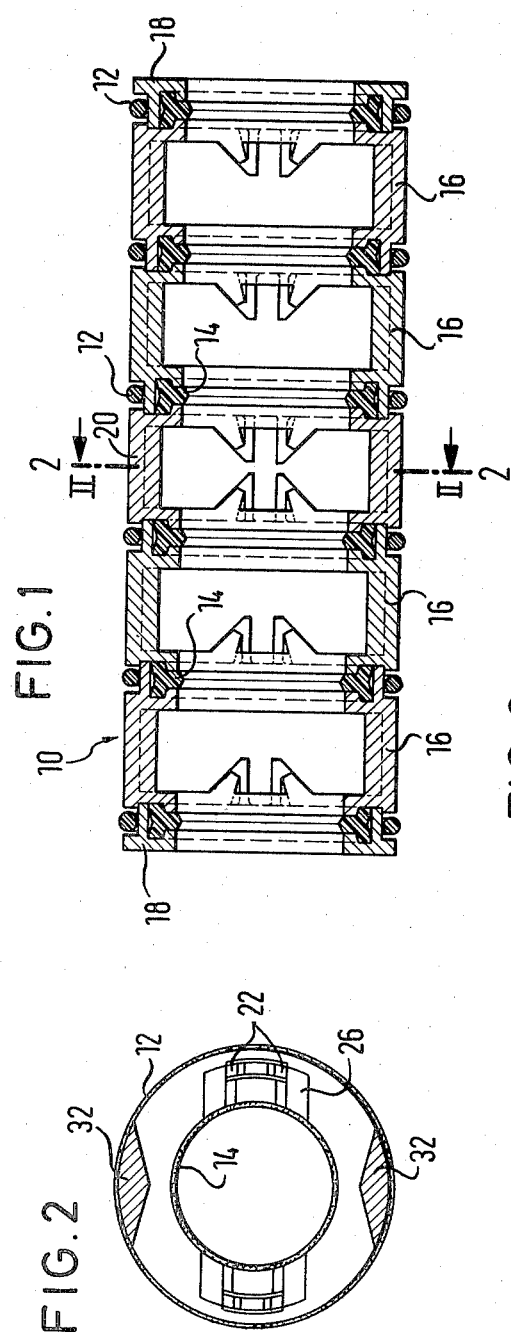

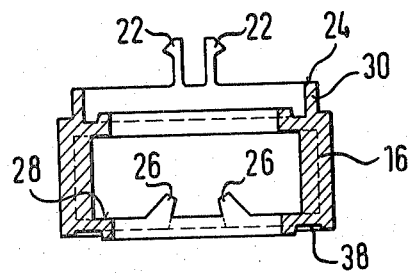
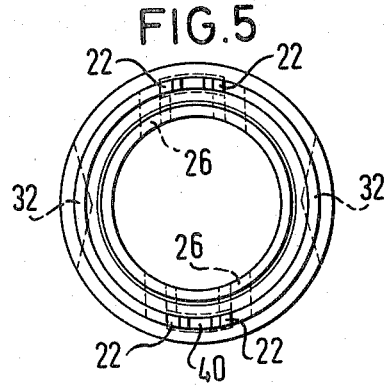
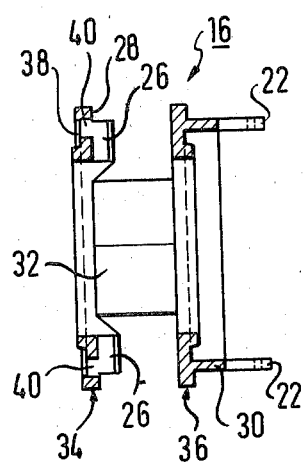
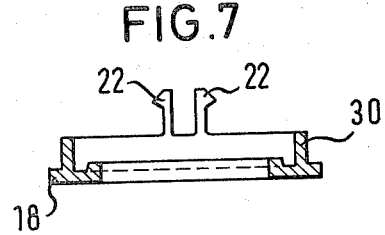
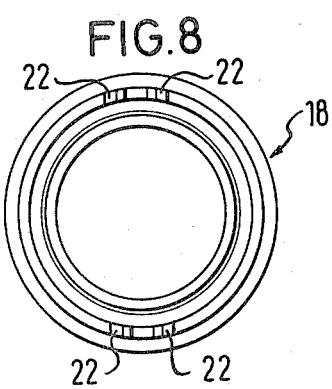
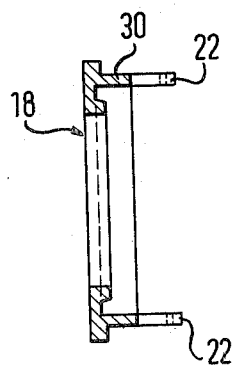

SEALING ARRANGEMENT, PARTICULARLY FOR SEALING VALVE PISTON RELATIVE TO VALVE HOUSING

BACKGROUND OF THE INVENTION

The present invention relates to a sealing arrangement, particularly for sealing a valve piston relative to a valve housing, which includes a plurality of axially spaced sealing rings, and a plurality of supporting rings which support and hold the sealing rings.

Sealing arrangement of the above-mentioned general type are known in the art. For sealing of a valve piston relative to a valve housing, a plurality of inner sealing rings, such as for example T-rings are utilized. In many valves it is necessary to use several seals or sealing rings which are arranged in axially spaced relationships relative to one another. Supporting rings are arranged between these sealing rings so as to hold and support the latter and form thereby spacer rings. The supporting rings protect the sealing rings from undue deformation, on the one hand, and hold the sealing rings at predetermined axial distances from one another, on the other hand. The known arrangements with inner sealing rings are composed of a plurality of individual parts. Thereby, the mounting and dismounting of such sealing arrangements is very time consuming and the tools required for these processes are very expensive.

SUMMARY OF THE INVENTION

Accordingly, it is an object of the present invention to provide a sealing arrangement which avoids the disadvantages of the prior art.

More particularly, it is an object of the present invention to provide a sealing arrangement which can be mounted and dismounted in a simpler and faster manner than the known arrangements, and is easy to exchange and to be accommodated in different valve devices.

In keeping with these objects and with others which will become apparent hereinafter, one feature of the present invention resides, briefly stated in a sealing arrangement which includes a plurality of sealing rings and a plurality of supporting rings which interengage one another so as to form an integral unit which can be mounted and dismounted as a whole.

When the sealing arrangement is designed in accordance with the present invention the entire unit can be mounted and dismounted as a whole and accommodated in a valve device. By utilization of greater or smaller numbers of supporting rings and sealing rings, the sealing arrangement can be utilized for different valve pistons or different valves.

In accordance with another advantageous feature of the present invention, each supporting ring has an axially extending projection at its one side, and an axially extending groove at its other side. Thereby, when two neighboring supporting rings are assembled with one another, the projection of one of these rings extends into and engages with the groove of the other neighboring ring.

In accordance with still another feature of the present invention, each side of the supporting ring has two diametrically opposite pairs of such projections and such grooves.

Yet another feature of the present invention resides in that the supporting ring is composed of two ring-shaped portions which are axially spaced from one another and connected by two diametrically opposite axial webs.

The axial webs may be provided at locations which are circumferentially offset from the locations of the projections and grooves.

In accordance with a further feature of the present invention, each ring is provided with through-going openings each extending between and leading to the respective pair of the grooves. Thereby, each pair of the projections of one neighboring supporting ring extend first through a respective one of the through-going openings and then extend into and engage with the respective pair of the grooves of the other neighboring supporting ring.

Still a further feature of the present invention is that the above-mentioned sealing unit is provided at its both end sides with end rings, and each end ring has axially extending projections which extend into and engage with the grooves of the neighboring supporting ring.

The sealing arrangement can be symmetrical relative to an axis which extends normal to the longitudinal axis of the arrangement. Two of the supporting rings and/or end rings are connected with one another by a connecting ring. The connecting ring has two grooves provided at each of its axial sides, so that the projections of the neighboring supporting rings and/or end rings extend into and engage with the grooves of the connecting ring.

In accordance with an additional advantageous feature of the present invention, each ring has an axially extending ring-shaped flange which extends into a ring-shaped recess of the neighboring ring so as to center two rings relative to one another.

The sealing rings may include a group of T-rings and O-rings. Advantageously, the above-mentioned ring-shaped flange supports the O-rings radially inwardly and supports the T-rings radially outwardly. The ring-shaped flanges determine the axial distances between the individual supporting rings, as well as between the supporting rings and the end rings.

Finally, the supporting rings, the connecting rings and the end rings may be constituted of a suitable elastic synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing a longitudinal section of a valve sealing arrangement in accordance with the present invention, including a plurality of supporting rings and a plurality of sealing rings;

FIG. 2 is a view showing a section taken along the line 2—2 of FIG. 1;

FIG. 3 is a view substantially corresponding to that of FIG. 1 but turned by 90° relative to the latter;

FIG. 4 is a view showing a longitudinal section of one of the supporting rings;

FIG. 5 is an end view of the supporting ring of FIG. 4;

FIG. 6 is a view substantially corresponding to that of FIG. 4 but turned by 90° relative to the latter;

FIG. 7 is a view showing a longitudinal section of an end ring;

FIG. 8 is an end view of the end ring of FIG. 7;

FIG. 9 is a view substantially corresponding to that of FIG. 7 but turned by 90° relative to the latter;

DESCRIPTION OF PREFERRED EMBODIMENTS

Figure 11:
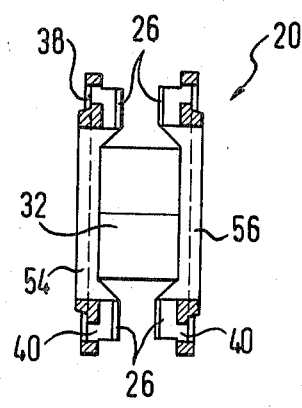
FIG. 11 is a view substantially corresponding to that of FIG. 10, but turned by 90° relative to the latter.

FIG. 1 shows a sealing arrangement or a sealing cartridge which includes a plurality of supporting rings 16, two end rings 18, and a connecting ring 20 assembled with one another. The individual rings are provided with snapping means engaging with one another, and thereby the individual rings are assembled as shown in FIG. 1. The supporting rings, the end rings, and the connecting rings in assembled condition embrace the respective sealing rings which include a group of O-rings 12 and a group of T-rings 14.

When the above-mentioned rings are assembled with one another they together form an integral unit which can be inserted into or withdrawn from a valve housing, and replaced or exchanged as a whole. In other words, the supporting rings, the end rings, the connecting rings, and the sealing rings of FIG. 1 together form a self-contained sealing structure which as a whole can be inserted into the valve housing and as a whole withdrawn from the same, in order to seal a valve piston relative to the valve housing or the individual connecting means.

Figure 14:
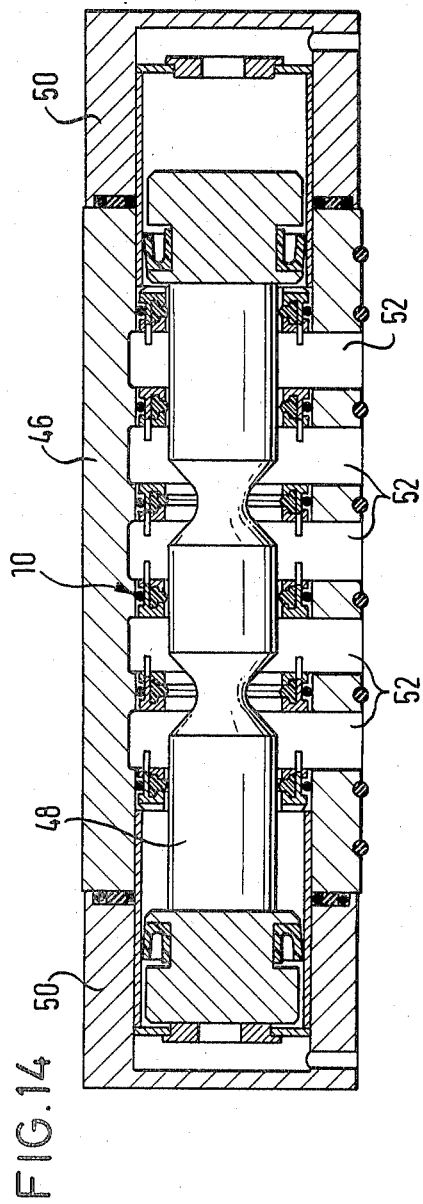
FIG. 14 is a view showing the sealing arrangement of FIG. 2 in mounted condition.

FIG. 14 shows the above-mentioned sealing arrangement which is identified by reference numeral 10. The sealing arrangement 10 is inserted in a valve housing 46 and arranged between the latter and an axially reciprocable valve piston 48. The valve housing 46 is closed at its both end sides with covers 50. The valve housing 46 is also provided with a plurality of connecting lines 52 for a pressure medium. The connecting lines 52 are sealed relative to one another by the sealing groups each including one O-ring and one T-ring.

FIG. 4 shows a section of a supporting ring 16. As can be seen from this Figure, the supporting ring 16 has a ring-shaped portion 34 and a ring-shaped portion 36. The portions 34 and 36 are connected with one another by two diametrically opposite axial webs 32. As can be seen for example from FIGS. 2 and 5, the connecting webs 32 extend only over a part of the periphery of the supporting ring 16 and have a substantially triangular shape such that one side of the triangle is formed by the outer periphery of the supporting ring.

The portion 36 has an axially extending ring-shaped flange 30 and two diametrically opposite pairs of projections 22 extending from the flange 30. This can be seen in FIG. 4. The projections 22 of each pair are spaced in circumferential direction from one another and provided with wedge-shaped tips which face away from one another. The end face of the ring-shaped portion 34 has two axial diametrically opposite pairs of detents 26 having a shape which can be seen in FIG. 4. As can be seen from the drawing the detents 26 extend in the same axial direction as the projections 22 and substantially align with the latter.

The ring-shaped portion 34 of the supporting ring 16 is provided at its lower end face or in its bottom with a recess 38 extending over the entire periphery and having a small axial depth. The ring-shaped portion 34 also has at its periphery an axial through-going opening 40 arranged between two detents 26 of each pair. When the neighboring supporting rings are assembled with one another, the projections 22 extend through the through-going openings 40.

The end ring 18 shown in FIG. 7 has the axially extending flange 30 and two diametrically opposite pairs of projections 22 extending axially from the flange 30. They are identical to the projections 22 of the supporting ring 16.

The sealing arrangement 10 can be composed, when necessary, of a plurality of the supporting rings 16 and the sealing rings as shown in FIG. 1. Advantageously, the thus formed sealing arrangement is symmetrical relative to a transverse plane 2—2 which extends normal to the longitudinal axis of the arrangement. This can be attained in a construction in which both inner supporting rings 16 of the arrangement 10 are connected with one another by the connecting ring 20. A further supporting ring 16 is connected with one of these inner supporting rings 16, and then an end ring 18 follows to form an end closure of the sealing arrangement 10.

Figure 12:
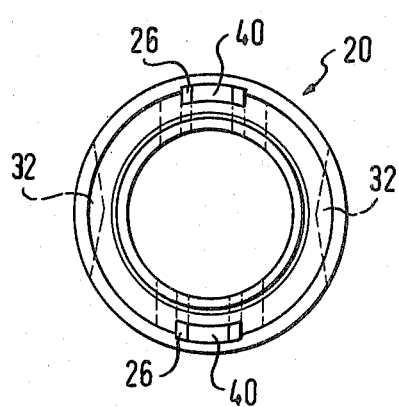
FIG. 12 is an end view of the connecting ring of FIG. 10.
Figure 10:
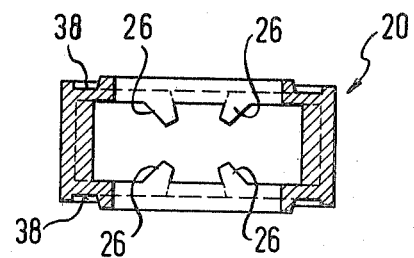
FIG. 10 is a view showing a longitudinal section of a connecting ring.

The connecting ring 20 is shown in FIGS. 10-12. It is also composed, similarly to the supporting ring 16, of two ring-shaped portion 54 and 56 which are connected with one another by two diametrically opposite axially extending webs 32. The webs 32 are advantageously identical to the webs 32 of the supporting ring 16. They also occupy only a portion of the periphery of the connecting ring and are circumferentially offset from the detents 26 and the projections 22.

The ring-shaped portions 54 and 56 have end faces which face toward one another. The ring-shaped portions 54 and 56 are each provided at their end face with two diametrically opposite pairs of axially extending detents 26. The detents 26 of the portions 54 and 56 extend inwardly and toward each other. They are located axially opposite and have a sufficient axial distance therebetween, so as to allow the extension and engagement of the projections 22 of the neighboring supporting ring, as can be seen from FIG. 1. The detents 26 are offset by 90° from the webs 32, similarly to the offset of the webs 32 of the supporting rings 16 relative to the detents 26 or projections 22.

Each end face of the connecting ring 20 has a ring-shaped recess 38 extending over the entire periphery of the same and having a small radial depth, as can be seen from FIG. 10. The ring-shaped portions 54 and 56 are provided in the peripheral region with axial through-going openings located betweenn the detents 26 of each pair. The projections 22 of the neighboring supporting ring 16 can extend through the axial through-going openings.

Figure 13:
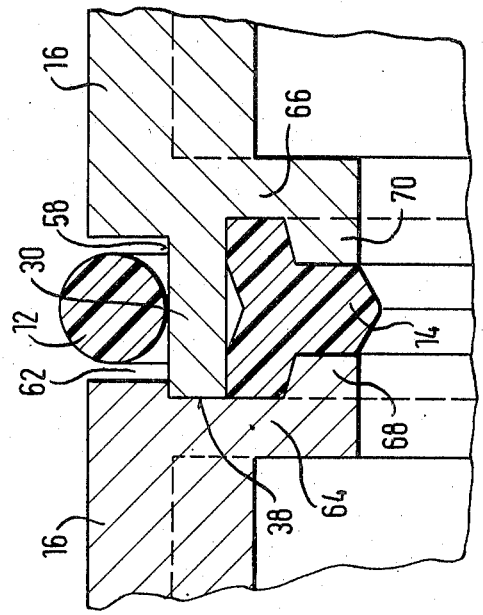
FIG. 13 is an enlarged view of the region in which sealing O-ring and T-ring are supported and held.

FIG. 13 shows two supporting rings 16 which are connected with one another by the snapping connection. The projections 22 and the detents 26 are not shown in this Figure. The ring-shaped flange 30 of one suporting ring 16 engages in the ring-shaped recess 38 of the other supporting ring 16. This engagement is designed so that the flange 30 abuts against the bottom of the recess 38 and the cylindrical outer face 58 of the flange 30 abuts against the cylindrical inner face of the ring-shaped shoulder 16 so as to provide for centering. The shoulder 30 is formed by the recess 38 in the supporting ring 16.

When the flange 30 of one supporting ring 16 engages in the recess 38 of the other supporting ring 16, the supporting rings are centered relative to one another. The axial height and width of the flange 30 determines the axial distance between these two supporting rings 16, so that by different selection of this axial width of the flange 30, a correspondence with different sealing rings 12, 13 can be provided.

As can be seen from FIG. 13, the outer diameter of the flange 30 is smaller than the outer diameter of the supporting ring 16 so as to form a circular groove 62 in which the O-ring 12 is received. Thereby, the O-ring 12 is supported inwardly by the cylindrical outer face 58 of the flange 30.

The inner T-shaped ring 14 is supported outwardly by the cylindrical inner face of the flange 30, at the same time, it is held axially by sections 64 and 66 of both supporting rings. The sections 64 and 66 are provided with ring-shaped lips 68 and 70 which abut against the T-ring 14 inwardly. Thereby, the flange 30 provides for the inner support of the O-ring 12 and the outer support of the T-ring 14. At the same time, it determines the axial distance between both neighboring supporting rings 16 and centers them relative to one another.

The individual rings are assembled with one another in the following manner. One O-ring 12 and one T-ring 14 are inserted in one supporting ring 16. The O-ring is arranged radially above the flange 30 and the T-ring 14 is arranged inwardly of the latter. After this, a second supporting ring 16 is connected with the thus-assembled first supporting ring 16 by inserting both pairs of the projections 22 axially through the through-going openings 40 between the detents 26, until the heads or tips of the projections 22 of one supporting ring 16 engage the detents 26 of the other supporting ring 16 and extend above or below the latter. When the projections 22 are inserted through the through-going openings 40, both projections are somewhat compressed toward one another until they get free from the detents 26. Thereafter, they spring back outwardly away from one another in their initial position and thereby engage with the detents. The supporting rings, as well as the end rings and the connecting rings can be constituted, for this purpose, for example of a suitable synthetic plastic material having sufficient elasticity or spring properties.

The connection of the end rings 18 with the supporting rings 16 is performed in the same way. The projections 24 of the end ring 18 are inserted through the through-going openings 40 of the neighboring supporting ring 16 so as to engage with the latter. The same is true for the connection between the supporting ring 16 or the end ring 18 with the connecting ring 20. In this connection, however, the connecting ring 20 is assembled at its both axial sides with the supporting rings 16 whose flanges 20 are provided with the respective O-rings and T-rings. Moreover, the projections 22 of both supporting rings 16 extend through the respective through-going openings 40 of the connecting ring 20, until they engage over and behind the detents 26 of the connecting ring 20. The projections of both supporting rings extend toward one another so as to form a symmetrical construction of the sealing arrangement 10.

The thus manufactured and assembled sealing arrangement 10, in which all elements are connected with one another in interengaging (form-locking) manner, form a commercially favorable and storage favorable unit. It can be mounted and dismounted and exchanged as a whole. Furthermore, the utilization of greater or smaller numbers of the supporting rings and the sealing rings makes possible to use the arrangement for different valves having different lengths or different number of connecting passages.

It will be understood that each of the elements described above, or two or more together, may also find a useful application in other types of constructions differing from the types described above.

While the invention has been illustrated and described as embodied in a sealing arrangement, particularly for sealing a valve piston relative to a valve housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sealing arrangement, particularly for sealing a valve piston relative to a valve housing having an axis, comprising a plurality of sealing rings arranged to be located between a valve piston and a valve housing, and axially spaced from each other; and a plurality of supporting rings located axially adjacent to each other and arranged to support and hold said sealing rings, said supporting rings being connected with said sealing rings in interengaging manner so as to form together with the same an integral unit which can be mounted and dismounted as a whole, each of said supporting rings having a body part with two axial sides and being provided with a first formation at one of said sides and a second formation on the other of said sides of said body part, said formations being arranged so that when two neighboring supporting rings are assembled with one another, the first formation of one of said neighboring supporting rings engages with the second formation of the other of said neighboring supporting rings.

2. A sealing arrangement as defined in claim 1, wherein said first formation includes at least one projection extending substantially axially from said body part at said one side, and said second formation includes at least one groove also extending substantially axially and formed in said body part at said other side, so that when the two neighboring supporting rings are assembled with one another the projection of one of the neigboring supporting rings extends into and engages in the groove of the other of the neighboring supporting rings.

3. A sealing arrangement as defined in claim 2, wherein said body portion is provided with two pairs of such diametrically opposite projections and two pairs of such diametrically opposite grooves.

4. A sealing arrangement as defined in claim 3, wherein said body part has two ring-shaped portions axially spaced from and connected with one another, one of said portions being provided with said projections, whereas the other of said portions is provided with said grooves; and further comprising means for connecting said ring-shaped portions with one another.

5. A sealing arrangement as defined in claim 4, wherein said connecting means includes two diametrically opposite connecting webs which substantially axially extend between and connect said two portions of said body part with one another.

6. A sealing arrangement as defined in claim 5, wherein said projections and said grooves are arranged at predetermined locations of said ring-shaped portions, said connecting webs being arranged at further locations which are circumferentially offset from said locations of said projections and said openings.

7. A sealing arrangement as defined in claim 4, wherein said other ring-shaped portion of said body part has two through-going openings which is provided between and leads to a respective one of said pair of grooves, so that each of the pairs of projections of one of the neighboring supporting rings extends first through a respective one of said through-going openings and then extend into and engage in a respective one of said pairs of grooves of the other of the neighboring supporting rings.

8. A sealing arrangement as defined in claim 2, wherein said unit has two axial ends and further includes two end rings each arranged at a respective one of said axial ends, each of said end rings being provided with two such pairs of projections which extend into and engage in the pairs of grooves of a neighboring one of said supporting rings.

9. A sealing arrangement as defined in claim 1, wherein said unit has an axis extending normal to said first-mentioned axis and is symmetrical relative to said second-mentioned axis, so that the latter forms an axis of symmetry of said unit.

10. A sealing arrangement as defined in claim 8, wherein said unit further includes a plurality of connecting rings arranged between and connecting two neighboring first-mentioned rings.

11. A sealing arrangement as defined in claim 10, wherein each of said connecting rings is arranged between and connects two neighboring supporting rings.

12. A sealing arrangement as defined in claim 10, wherein each of said connecting rings is arranged between and connects one of said supporting rings and a respective one of said end rings.

13. A sealing arrangement as defined in claim 10, wherein each of said connecting rings has two axial faces each provided with two such pairs of grooves, so that the projections of a respective one of said first-mentioned rings can extend into and engage with the grooves of a respective one of said connecting rings.

14. A sealing arrangement as defined in claim 10, wherein each of said rings is provided with means for centering two neighboring rings relative to one another.

15. A sealing arrangement as defined in claim 14, wherein said centering means includes a ring-shaped flange formed on one of the neighboring rings, and a ring-shaped recess formed in the other of the neighboring ring and receiving said flange.

16. A sealing arrangement as defined in claim 15, wherein said plurality of sealing elements includes a first group of sealing T-rings and a second group of sealing O-rings, each of said flanges supporting a respective one of said T-rings radially outwardly, and supporting a respective one of said O-rings radially inwardly.

17. A sealing arrangement as defined in claim 15, wherein each of said flanges has a predetermined axial length and extends between the two neighboring rings so as to determine an axial distance between the latter.

18. A sealing arrangement as defined in claim 15, wherein said rings are constituted of synthetic plastic material.

* * * * *